United States Patent
Chiu et al.

(10) Patent No.: US 7,269,227 B2
(45) Date of Patent: Sep. 11, 2007

(54) APPARATUS AND METHOD FOR CALCULATING BIT METRICS IN DATA RECEIVERS

(75) Inventors: Mao-Ching Chiu, Hsinchu (TW); Chi-Chao Chao, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 827 days.

(21) Appl. No.: 10/653,279

(22) Filed: Sep. 2, 2003

(65) Prior Publication Data

US 2005/0047524 A1 Mar. 3, 2005

(51) Int. Cl.
*H04L 5/12* (2006.01)
(52) U.S. Cl. .................. 375/265; 375/262; 375/341; 375/232
(58) Field of Classification Search ........... 375/262, 375/233, 341; 370/203; 714/794; 382/131; 704/230
See application file for complete search history.

(56) References Cited

U.S. PATENT DOCUMENTS

| | | | |
|---|---|---|---|
| 5,692,102 A * | 11/1997 | Pan | 704/230 |
| 6,980,602 B1 * | 12/2005 | Kleinerman et al. | 375/262 |
| 7,065,146 B1 * | 6/2006 | Lou et al. | 375/262 |
| 7,103,204 B1 * | 9/2006 | Celler et al. | 382/131 |
| 7,111,226 B1 * | 9/2006 | Cameron et al. | 714/794 |
| 7,133,473 B1 * | 11/2006 | Lou et al. | 375/341 |
| 2004/0218519 A1 * | 11/2004 | Chiou et al. | 370/203 |
| 2005/0036541 A1 * | 2/2005 | McKown | 375/233 |

* cited by examiner

*Primary Examiner*—Chieh M. Fan
*Assistant Examiner*—Sudhanshu C. Pathak
(74) *Attorney, Agent, or Firm*—Thomas, Kayden, Horstemeyer & Risley

(57) ABSTRACT

An apparatus and method for calculating bit metrics in data receivers. The apparatus of the invention includes a storage unit and a calculator. The storage unit is configured to store a number of modulation-dependent coefficients; it selects as output one of the coefficients in accordance with a modulation mode being used. The calculator receives the selected coefficient from the storage unit and takes a received signal and a channel response in the frequency domain. According to the selected coefficient, the received signal and the channel response, the calculator generates at least N number of bit metrics for an N-bit codeword in the received signal.

18 Claims, 6 Drawing Sheets

APPARATUS AND METHOD FOR CALCULATING BIT METRICS IN DATA RECEIVERS

BACKGROUND OF THE INVENTION

1. Field of the Invention

The invention relates to digital communication systems, and more particularly to a mechanism of metric generation for a baseband signal substantially received over a flat fading channel.

2. Description of the Related Art

With the rapidly growing demand for cellular mobile radio and other wireless transmission services, there has been an increasing interest in exploiting various technologies to provide reliable, secure, and efficient wireless communications. Orthogonal Frequency Division Multiplexing (OFDM) is a special case of multi-carrier transmission; it is well known as a highly spectral efficient transmission scheme capable of dealing with severe channel impairment encountered in a wireless environment. The basic idea of OFDM is to divide the available spectrum into several sub-channels (subcarriers). By making all sub-channels narrowband, they experience almost flat fading, which makes equalization very simple. To obtain a high spectral efficiency, the frequency responses of the sub-channels are overlapping and orthogonal. This orthogonality can be completely maintained by introducing a guard interval, even though the signal passes through a time-dispersive channel. A guard interval is a copy of the last part of the OFDM symbol which is pre-appended to the transmitted symbol. This makes the transmitted signal periodic, which plays a decisive role in avoiding inter-symbol and inter-carrier interference.

OFDM can largely eliminate the effects of inter-symbol interference (ISI) for high-speed transmission in highly dispersive channels by separating a single high speed bit stream into a multiplicity of much lower speed bit streams each modulating a different subcarrier. Moreover, the use of error coding, interleaving, and channel-state information (CSI) allows OFDM to function in a manner that is well suited to the needs of high-speed wired or wireless transmission. In order to combat frequency-selective fading and interference, channel coding with soft-decision decoding can be properly integrated with an OFDM system. Soft-decision decoding, in contrast to hard-decision, makes decisions on the information bits without making direct decisions about the transmitted symbols or codewords. In fact, this results in better performance. Since the soft-decision decoding significantly outperforms hard-decision decoding, it is preferable for use in wireless systems. In a soft-decision decoding algorithm, a measure or metric of the received signal must be defined and the metric is closely related to the modulation schemes. Accordingly, a bit metric needs to be made separately for each received bit to indicate a degree of confidence.

OFDM was previously adopted for wireless local area network (WLAN) applications as part of the IEEE 802.11a standard in the 5 GHz frequency band. In June of 2003, IEEE announced its final approval of the IEEE 802.11g standard which also adopted OFDM as a mandatory part for a further high-speed physical layer (PHY) extension to the 802.11b standard in the 2.4 GHz band. However, the existing mass-produced WLAN products are not very cost-effective. Several studies have shown that the system performance is heavily dependent on metric computation in the soft-decision decoding. Therefore, the method of calculating bit metrics is critical to system performance in WLAN receivers. Furthermore, soft-decision decoding makes the decoder more complex and difficult to implement. In view of the above, a novel scheme for calculating bit metrics in WLAN receivers unencumbered by the existing limitations is called for.

SUMMARY OF THE INVENTION

It is an object of the present invention to provide a low-complexity mechanism of bit metric generation for a soft-decision decoder in a data receiver.

It is another object of the present invention to provide a cost-effective scheme for calculating bit metrics in data receivers, which is well-suited to integrated circuit implementation.

The present invention is generally directed to an apparatus and method of bit metric calculation for a baseband signal substantially received over a flat fading channel covering a single carrier. According to one aspect of the invention, a method for calculating bit metrics in data receivers is proposed. First, one of modulation-dependent coefficients is selected according to a modulation mode being used. In addition, a received signal and a channel response in the frequency domain are taken. From a function of the selected coefficient, the received signal and the channel response, at least N number of bit metrics are thus calculated for an N-bit codeword in the received signal.

In a preferred embodiment of the invention, an apparatus for calculating bit metrics in data receivers is disclosed. The apparatus of the invention includes a storage unit and a calculator. The storage unit is configured to store a plurality of modulation-dependent coefficients and to select as output one of the coefficients according to a modulation mode being used. The calculator receives the selected coefficient from the storage unit and takes a received signal and a channel response in the frequency domain. From a function of the selected coefficient, the received signal and the channel response, the calculator generates at least N number of bit metrics for an N-bit codeword in the received signal.

DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

Figure 1C:
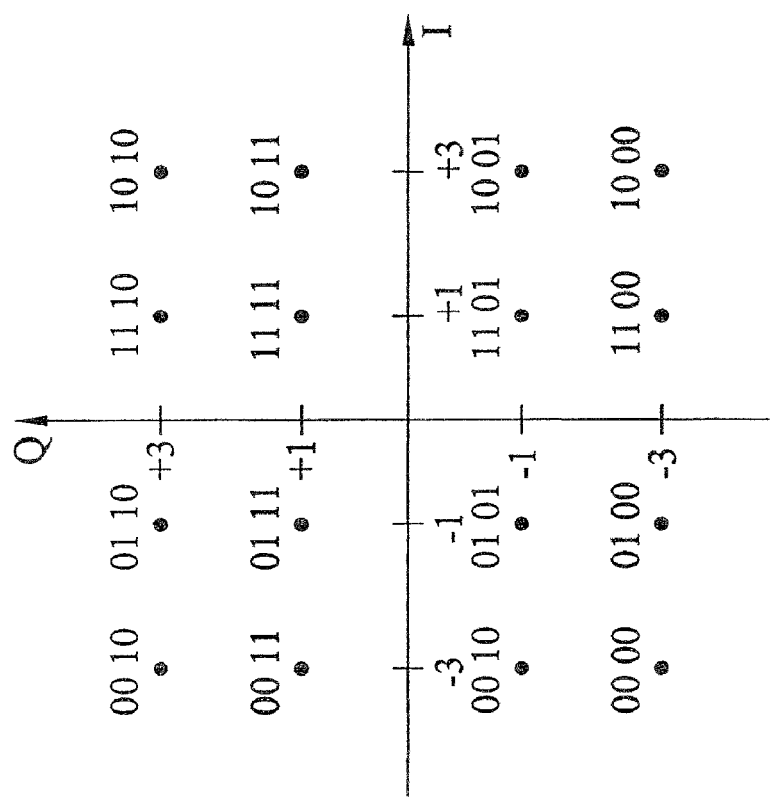
FIGS. 1A through 1D are graphs showing BPSK, QPSK, 16-QAM, and 64-QAM constellation bit encoding.
Figure 1A:
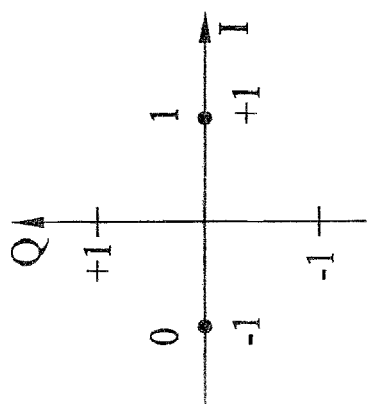
Figure 1B:
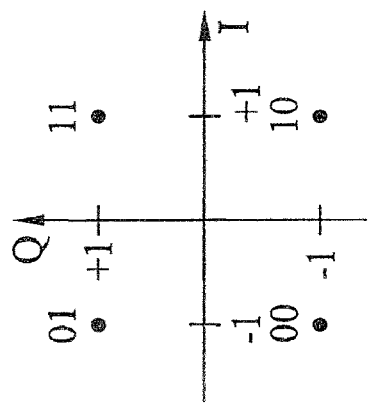
Figure 1D:
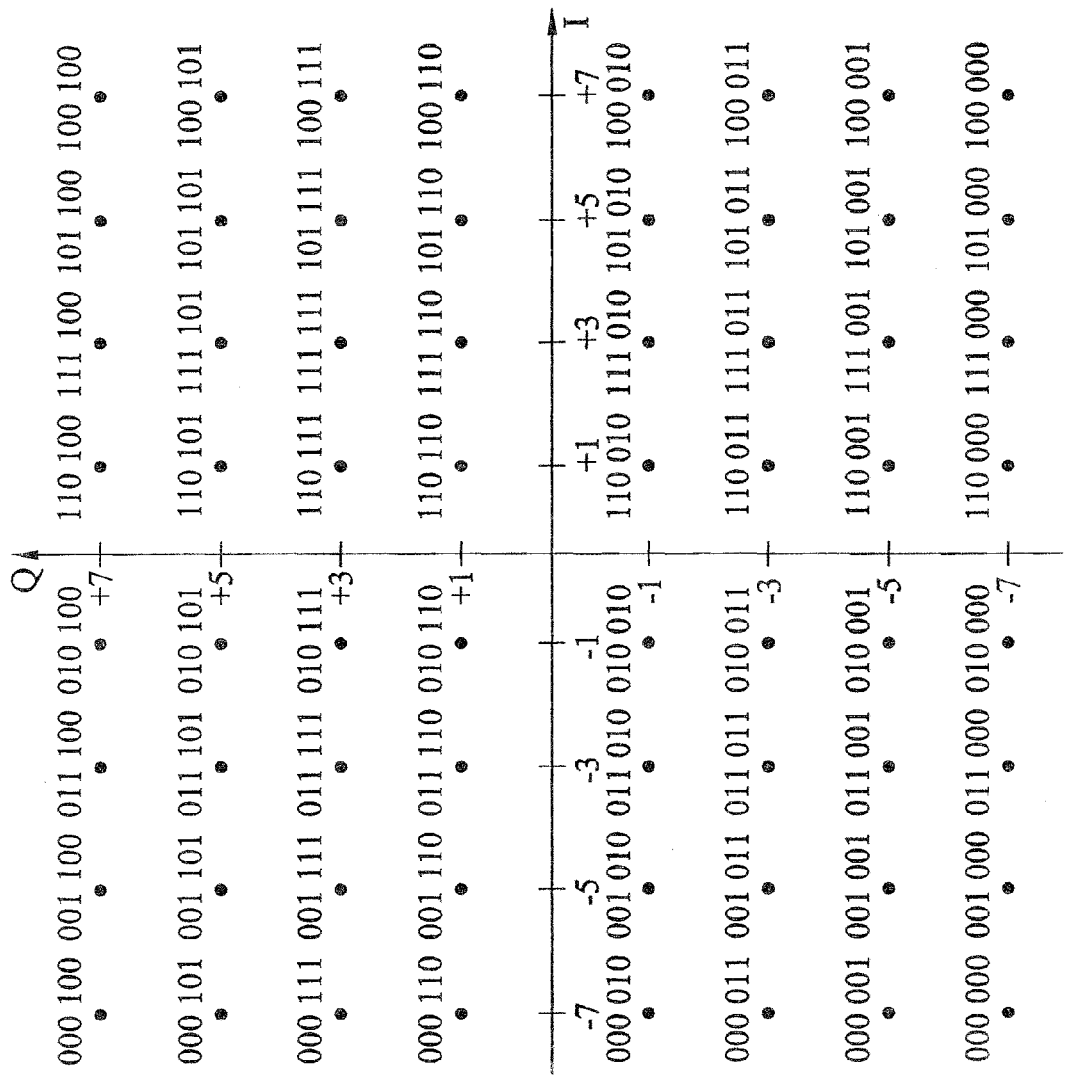

The present invention will now be described in the context of the use of OFDM for communication, although the present invention is not limited to OFDM. The present invention is also described with reference to a wireless communication system that conforms to the IEEE 802.11a standard. According to the invention, the communication system need not be wireless and the conformant 802.11a transceiver referred to herein is merely an example of elucidation.

In a conformant 802.11a transceiver, the encoded and interleaved binary serial data can be divided into groups of N bits and converted into complex numbers representing BPSK, QPSK, 16-QAM, or 64-QAM constellation points. The conversion is performed according to Gray-coded constellation mappings, illustrated in FIG. 1, with the input bit, $b_0$, being the earliest in the stream. Let $b \triangleq (b_0, b_1, \ldots, b_{N-1})$ denote a binary codeword and d(b) represent the constellation point corresponding to the codeword b. The value d(b) is a complex number formed by multiplying the resulting (I+jQ) value by a normalization factor $K_{MOD}$, as follows:

$$d(b) = (I+jQ) \times K_{MOD}$$

where I, Q denote in-phase and quadrature components of the constellation point corresponding to the codeword b, respectively, and $K_{MOD}$ denotes a normalization factor. The normalization factor $K_{MOD}$ depends on the base modulation mode as prescribed in Table 1. The purpose of the normalization factor is to achieve the same average power for all mappings.

TABLE 1

| Modulation | $K_{MOD}$ |
|---|---|
| BPSK | 1 |
| QPSK | $1/\sqrt{2}$ |
| 16-QAM | $1/\sqrt{10}$ |
| 64-QAM | $1/\sqrt{42}$ |

The constellation considered herein is a generalized $2^N$-QAM with N equal to 1 or an even number. For example, FIGS. 1A through 1D show BPSK, QPSK, 16-QAM and 64-QAM constellations for N=1, 2, 4, 6, respectively. The stream of input bits is divided into groups of $N_{SD}$=48 binary codewords. Let $b_k \triangleq (b_{k,0}, b_{k,1}, \ldots, b_{k,N-1})$ be a binary codeword where subscript k denotes a subcarrier index and k=0, ..., $N_{SD}$−1. For brevity, the output of the constellation mapping, $d(b_k)$, is simply referred to as $d_k$. Assuming that N is even, the codeword $b_k$ is typically divided into two parts: $b_k^{(I)} \triangleq (b_{k,0}, b_{k,1}, \ldots, b_{k,N/2-1})$ and $b_k^{(Q)} \triangleq (b_{k,N/2}, b_{k,N/2+1}, \ldots, b_{k,N-1})$. The first part $b_k^{(I)}$ is mapped into the real part (I component) of $d_k$ while the second part $b_k^{(Q)}$ is mapped into the imaginary part (Q component) of $d_k$. Note that the bit ordering in I, Q components conforms to, but is not limited to, the IEEE 802.11a standard. In 802.11a, a 64-point IFFT is performed so a discrete-time OFDM symbol can be expressed as $$a_n = \sum_{k=0}^{N_{SD}-1} d_k \exp(j2\pi M(k)n/64)$$

where n denotes a time index and the function, M(k), defines a mapping from the logical number 0 to 47 into frequency offset index −26 to 26, $$M(k) = \begin{cases} k-26, & 0 \le k \le 4 \\ k-25, & 5 \le k \le 17 \\ k-24, & 18 \le k \le 23 \\ k-23, & 24 \le k \le 29 \\ k-22, & 30 \le k \le 42 \\ k-21, & 43 \le k \le 47 \end{cases}$$

In fact, M(k) skips the pilot subcarrier locations and the $0^{th}$ (dc) subcarrier.

At the receiver end, a baseband signal received over an ISI channel is given by:

$$r'_n = \sum_{k=0}^{N_{SD}-1} d_k H_{ch}(e^{j2\pi M(k)/64}) \exp(j2\pi M(k)n/64) + \eta_n$$

where $\eta_n$ is the complex white Gaussian noise with variance $2\sigma^2$, and $H_{ch}(Z)$ represents the z-transform of the channel response $h_{ch} \triangleq (h_{ch,0}, h_{ch,1}, \ldots, h_{ch,K})$, i.e.

$$H_{ch}(z) = \sum_{i=0}^{K} h_{ch,i} z^{-i}.$$

After timing and phase compensation, the received signal becomes $$v_n = \sum_{k=0}^{N_{SD}-1} d_k H_{ch}(e^{j2\pi M(k)/64}) H_{rx}(e^{j2\pi M(k)/64}) \exp(j2\pi M(k)n/64) + \eta'_n$$

where $H_{rx}(z)$ denotes the transfer function of an equivalent compensation filter in the receiver. Thus, the FFT result at the kth subcarrier is given by:

$$y_k = d_k H_{ch}(e^{j2\pi M(k)/64}) H_{rx}(e^{j2\pi M(k)/64}) + W_k$$

This can be rewritten as:

$$y_k = d_k H_k + W_k$$

where $H_k = H_{ch}(e^{j2\pi M(k)/64}) H_{rx}(e^{j2\pi M(k)/64})$. It is shown that $W_k$ is also a Gaussian noise with variance $\sigma_k^2 = 2L\sigma^2 \alpha_k$, where L is the number of points of the fast Fourier transform and $\alpha_k = |H_{rx}(e^{j2\pi M(k)/L})|^2$. Hereinafter $\alpha_k$ is called the noise normalization factor at the kth subcarrier. Note that the variance of $W_k$ is different from subcarrier to subcarrier due to the effect of $H_{rx}(z)$.

If the received signal is perfectly compensated for a frequency offset, $\Delta f$, the noise normalization factor is then given by:

$$\alpha_k = |H_{rx}(e^{j2\pi(M(k)+\Delta f T_{sample})/L})|^2$$

The composite channel response, $H_k$, also becomes $$H_k = H_{ch}(e^{j2\pi(M(k)+\Delta f T_{sample})/L}) H_{rx}(e^{j2\pi(M(k)+\Delta f T_{sample})/L})$$

Conventionally, a one-tap equalizer is employed to recover the original signal $d_k$, which, in turn, can derive the codeword $b_k$. The one-tap equalizer multiplies the FFT result $y_k$ by the reciprocal of $H_k$, that is:

$$\hat{d}_k = y_k/H_k = d_k + W_k/H_k$$

Then, a hard-decision de-mapping algorithm is used to reproduce the codeword $b_k$ by quantizing $\hat{d}_k$ to the nearest point among the constellation. However, the conventional de-mapping algorithm has the drawbacks of noise enhancement and performance loss due to hard-decision decoding. In contrast, the present invention combines the equalization and de-mapping algorithms in the maximum-likelihood sense to generate bit metrics for soft-decision decoding.

In regard to the received signal, $y_k$, the maximum-likelihood (ML) bit metrics for all bits of $b_k$ can be computed from an equation of the form:

$$\Gamma(b_{k,n}) = \log \frac{\sum_{b_k: b_{k,n}=1} p(y_k \mid b_k)}{\sum_{b_k: b_{k,n}=0} p(y_k \mid b_k)},$$

for $k=0, \ldots, N_{SD}-1$ and $n=0, \ldots, N-1$

For the flat fading channels, the conditional probability $P(y_k|b_k)$ can be expressed as:

$$p(y_k \mid b_k) = \lambda \exp\left(-\frac{|y_k - H_k d(b_k)|^2}{2\sigma_k^2}\right)$$

where $\lambda$ is a constant. Therefore, the ML bit metrics is recast into:

$$\Gamma(b_{k,n}) = \log \frac{\sum_{b_k: b_{k,n}=1} \exp(-|y_k - H_k d(b_k)|^2/2\sigma_k^2)}{\sum_{b_k: b_{k,n}=0} \exp(-|y_k - H_k d(b_k)|^2/2\sigma_k^2)}$$

for $k=0, \ldots, N_{SD}-1$ and $n=0, \ldots, N-1$. It can be seen that the computational complexity of the ML algorithm is proportional to $2^N$ per bit. Although the ML bit metric is optimal, it is prohibitive for practical applications when the codeword length N is large.

It should be understood that the maximum-likelihood function is invariant to scaling and/or translation of the bit metrics. Let $X(b_{k,n}) = \sigma_k^2 \Gamma(b_{k,n})/2$. Therefore, $$X(b_{k,n}) = \frac{\sigma_k^2}{2}\Gamma(b_{k,n}) = L\alpha_k \sigma^2 \Gamma(b_{k,n})$$

for $k=0, \ldots, N_{SD}-1$ and $n=0, \ldots, N-1$. As a result, the metric for subcarrier k of bit n is given by:

$$\Lambda(b_{k,n}) = L\sigma^2 \Gamma(b_{k,n}) = X(b_{k,n})/\alpha_k, \text{ for } k=0, \ldots, N_{SD}-1 \text{ and } n=0, \ldots, N-1$$

Taking BPSK modulation as an example, it gives:

$$X(b_{k,0}) = \frac{\sigma_k^2}{2}\Gamma(b_{k,0}) = \text{Re}[y_k H_k^*]$$

where superscript * denotes complex conjugation and Re[·] denotes the real part of a complex number. The metric for bit $b_{k,0}$ is therefore expressed as:

$$\Lambda(b_{k,0}) = \text{Re}[y_k H_k^*]/\alpha_k$$

Figure 2:
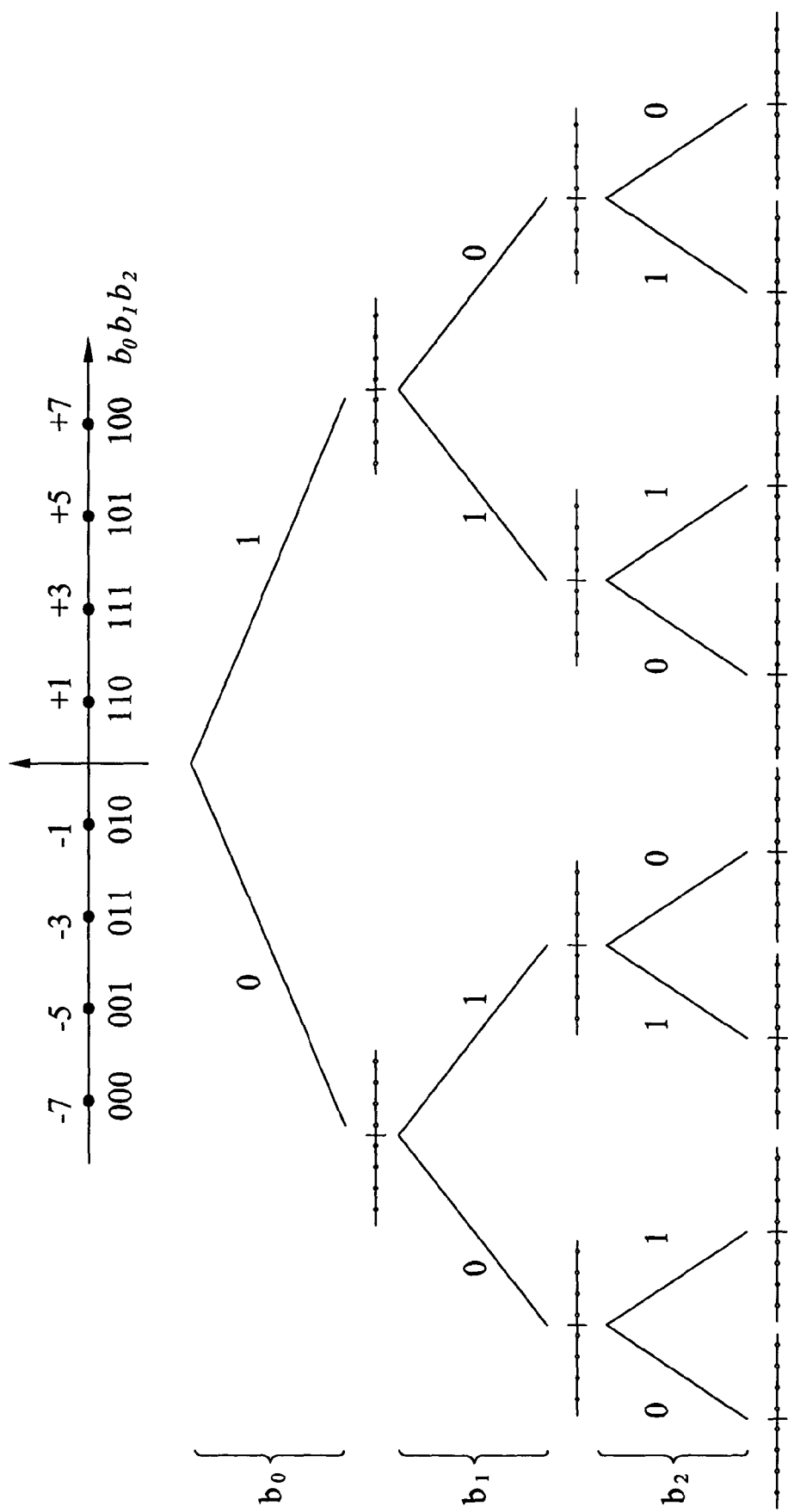
FIG. 2 is a graph showing tree-like partitions of the 8-PAM constellation according to the invention.

Since the constellation mappings are Gray coded in the IEEE 802.11a, the neighboring signal points can be grouped so that they constitute the property of tree-like partitions according to $b_0, \ldots, b_{N-1}$. A single $2^N$-QAM symbol or codeword may be viewed as a pair of symbols that each can take one of $2^{N/2}$ real values ($2^{N/2}$-PAM) and thus conveys N/2 bits of information. For example, an 8-PAM constellation corresponding to the I or Q component of the 64-QAM constellation is illustrated in the top portion of FIG. 2. As depicted, the 8-PAM constellation is partitioned according to $b=(b_0,b_1,b_2)$. In this regard, the $1^{st}$ bit, $b_0$, indicates whether the signal point is located on the left or right side of the 8-PAM constellation. If $b_0=1$, the signal point is on the right side, i.e., located among a subset of constellation: +1, +3, +5 and +7; if $b_0=0$, the signal point is on the left side, i.e., located among a subset of constellation: −1, −3, −5 and −7. The $2^{nd}$ bit, $b_1$, indicates whether the signal point is located on the left or right side of the previously selected subset of constellation. As well, the remaining bit(s) can indicate the location of that signal point in a similar manner. Accordingly, it is possible to estimate the bit metrics directly from the received signal without any further complex computations.

Figure 3:
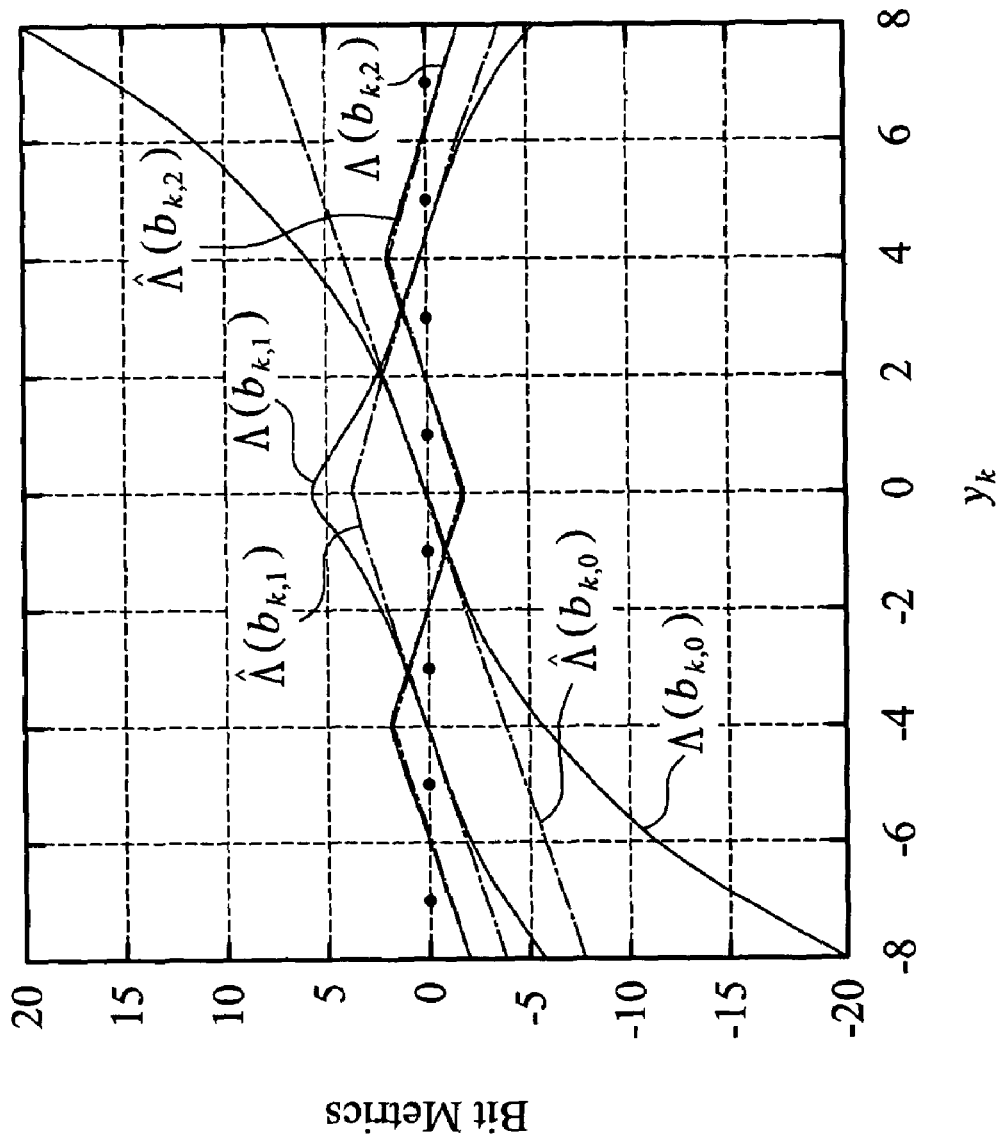
FIG. 3 is a graph showing the maximum-likelihood bit metrics versus the piecewise linear bit metrics according to the invention, in the case of 8-PAM with Gray-coded mapping.

In the case of the 8-PAM constellation, FIG. 3 shows the ML bit metrics, $\Lambda(b_{k,n})$ for n=0, 1, 2, with respect to the received signal with $H_k=1$, $\alpha_k=1$, and $E_b/N_0=6$ dB. It can be seen that $\Lambda(b_{k,n})$ always has zero crossings at the partition boundaries so the bit metrics can be approximated by a set of piecewise linear functions. According to the invention, the bit metrics are approximated by the following expressions. For BPSK, the approximated metric is given by:

$$\hat{X}(b_{k,0}) = \text{Re}[y_k H_k^*]$$

For $2^N$-QAM with N even, the metrics are first approximated by:

$$\hat{X}(b_{k,0}) = \text{Re}[y_k H_k^*] \qquad (1)$$
$$\hat{X}(b_{k,1}) = -|\hat{X}(b_{k,0})| + 2^{N/2-1} K_{MOD} |H_k|^2$$
$$\hat{X}(b_{k,2}) = -|\hat{X}(b_{k,1})| + 2^{N/2-2} K_{MOD} |H_k|^2 \text{ for } I \text{ component}$$
$$\vdots$$
$$\hat{X}(b_{k,N/2-1}) = -|\hat{X}(b_{k,N/2-2})| + 2 K_{MOD} |H_k|^2$$

and $$\hat{X}(b_{k,N/2}) = \text{Im}[y_k H_k^*] \qquad (2)$$
$$\hat{X}(b_{k,N/2+1}) = -|\hat{X}(b_{k,N/2})| + 2^{N/2-1} K_{MOD} |H_k|^2$$
$$\hat{X}(b_{k,N/2+2}) = -|\hat{X}(b_{k,N/2+1})| + 2^{N/2-2} K_{MOD} |H_k|^2 \text{ for } Q \text{ component}$$
$$\vdots$$
$$\hat{X}(b_{k,N-1}) = -|\hat{X}(b_{k,N-2})| + 2 K_{MOD} |H_k|^2$$

where |·| denotes the absolute value function and $|H_k|^2$ is the power of the channel response $H_k$. Consequently, the bit metric for $b_{k,n}$ is obtained by:

$$\hat{\Lambda}(b_{k,n}) = \hat{X}(b_{k,n})/\alpha_k \quad (3)$$

It should be appreciated that the noise normalization factor $\alpha_k$ can be directly generated by an adaptive channel estimator. Still referring to FIG. 3, the solid lines show the ML bit metrics $\Lambda(b_{k,n})$ while the dashed-dotted lines show the approximated bit metrics $\hat{\Lambda}(b_{k,n})$ according to the invention. FIG. 3 exhibits that the ML bit metrics are well approximated by the invention even at very low signal-to-noise ratios (SNR).

Instead of the recursive form, equations (1) and (2) can be viewed as a function of $y_k$, $H_k$ and $C_i$:

$$\hat{X}(b_{k,i}) = \begin{cases} \text{Re}[y_k H_k^*], & i = 0 \\ -|\hat{X}(b_{k,i-1})| + C_i|H_k|^2, & i = 1, \cdots, N/2-1 \end{cases} \text{ for } I \text{ component} \quad (4)$$

and $$\hat{X}(b_{k,N/2+i}) = \begin{cases} \text{Im}[y_k H_k^*], & i = 0 \\ -|\hat{X}(b_{k,N/2+i-1})| + C_i|H_k|^2, & i = 1, \cdots, N/2-1 \end{cases} \text{ for } Q \text{ component} \quad (5)$$

where $C_i = 2^{N/2-i} K_{MOD}$, $C_i$ represents a modulation-dependent coefficient. In order to apply to most systems for any bit permutation, equation (4) is further recast into:

$$\hat{X}(b_{k,n_i}) = \begin{cases} \text{Re}[y_k H_k^*], & \text{if } i = 0 \\ -|\hat{X}(b_{k,n_{i-1}})| + C_i|H_k|^2, & \text{otherwise} \end{cases} \quad (6)$$

where subscript $n_i$ is an integer and bits $(b_{k,n_0} b_{k,n_1} \ldots b_{k,n_{N/2-1}})$ are used to encode the I component of an N-bit codeword. Likewise, equation (5) can be written as:

$$\hat{X}(b_{k,n_i}) = \begin{cases} \text{Im}[y_k H_k^*], & \text{if } i = 0 \\ -|\hat{X}(b_{k,n_{i-1}})| + C_i|H_k|^2, & \text{otherwise} \end{cases} \quad (7)$$

where subscript $n_i$ is also an integer and bits $(b_{k,n_0} b_{k,n_1} \ldots b_{k,n_{N/2-1}})$ are used to encode the Q component of an N-bit codeword. In addition to OFDM systems, the invention is well suited to single-carrier systems in flat fading channels by directly eliminating subscript k in equations (1) to (7).

Figure 4:
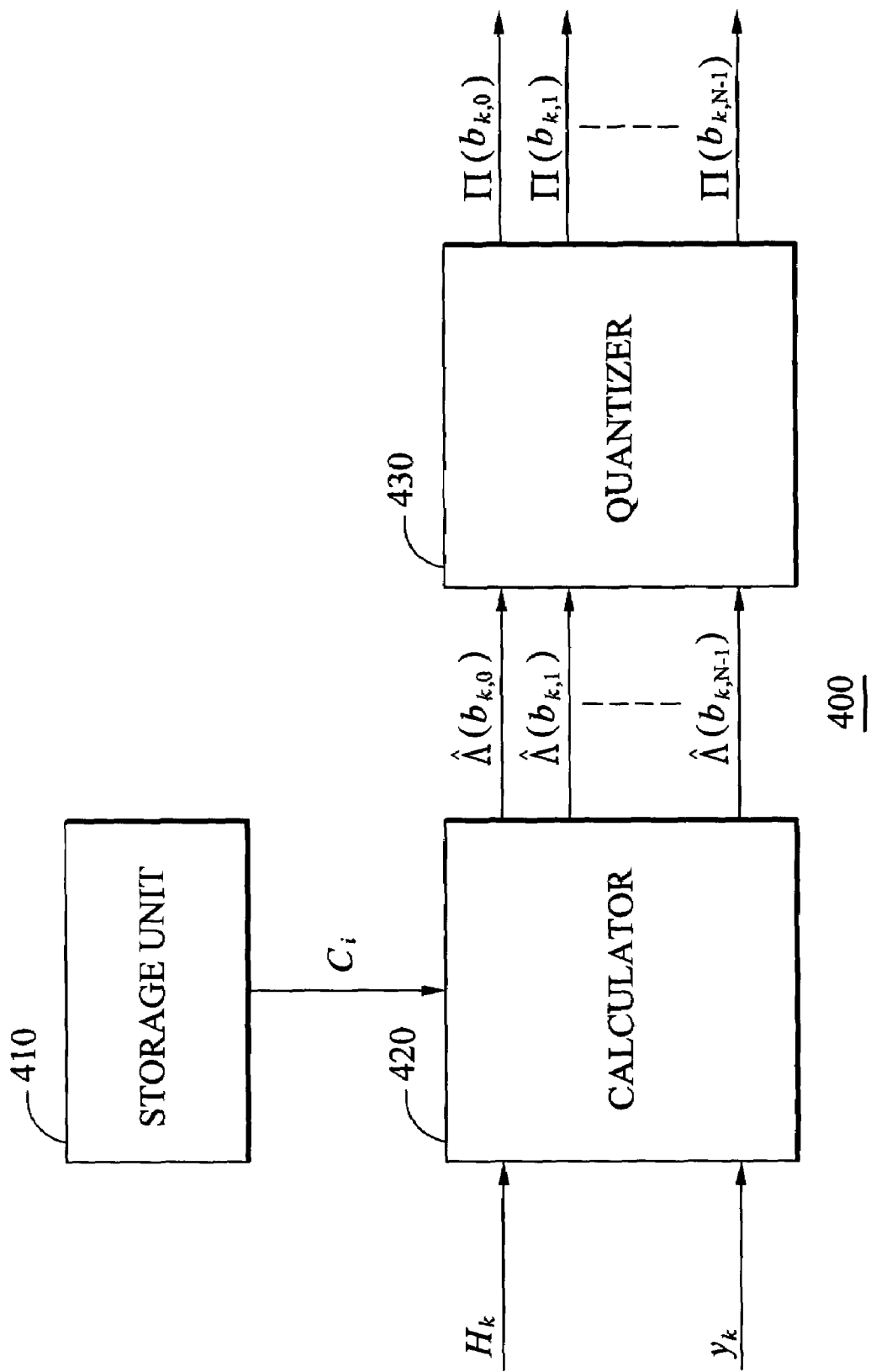
FIG. 4 is a block diagram illustrating an apparatus for calculating bit metrics in data receivers according to the invention.
Figure 5:
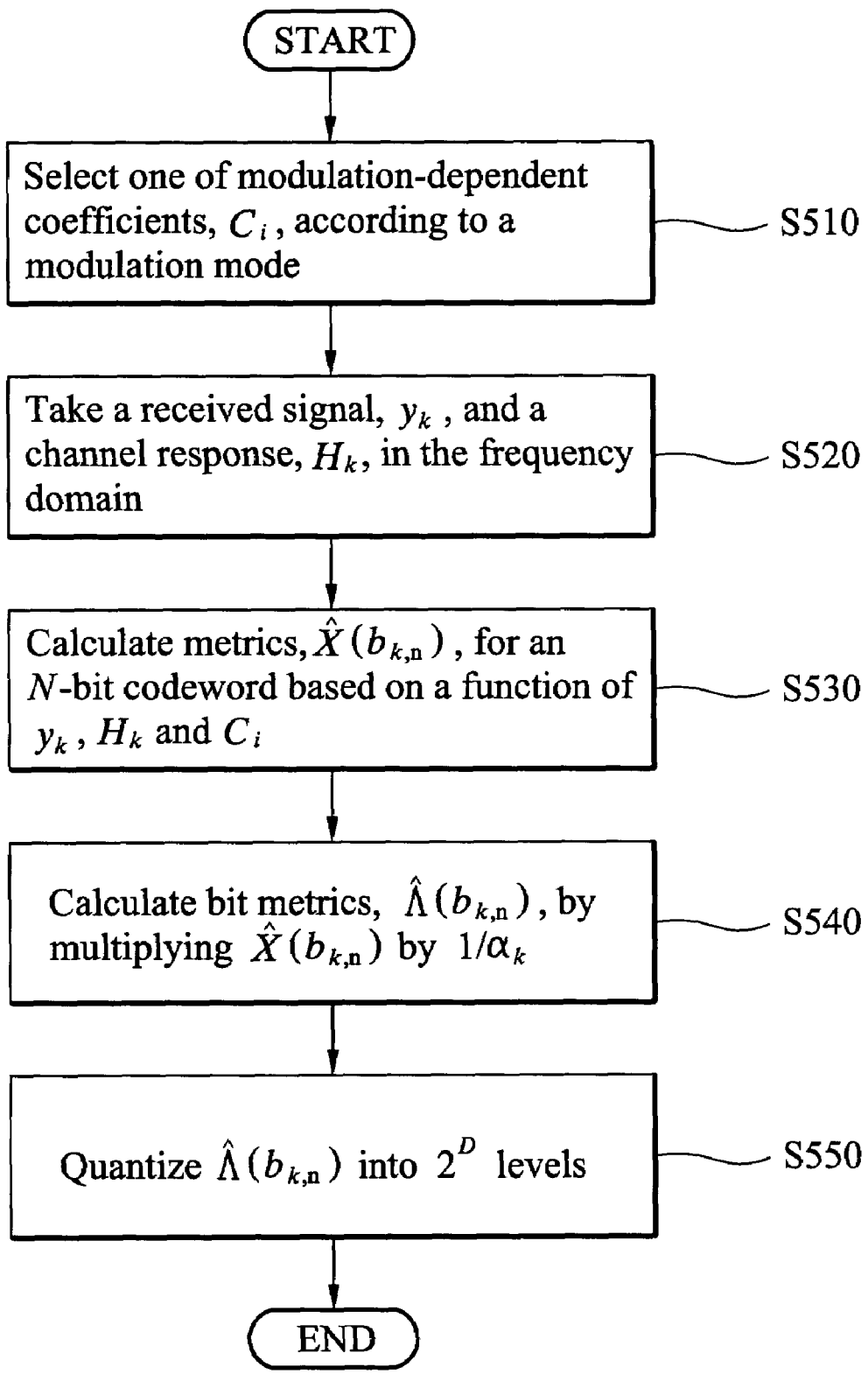
FIG. 5 is a flowchart illustrating primary steps of the invention.

The invention will now be explained from a preferred embodiment of FIG. 4 in conjunction with the accompanying operational flowchart of FIG. 5. An apparatus of the invention, denoted by reference number 400, includes a storage unit 410 and a calculator 420 as shown in FIG. 4. The storage unit 410 is configured to store a plurality of modulation-dependent coefficients. In accordance with a modulation mode being used, the storage unit 410 selects as output one of the coefficients, $C_i$, where $C_i = 2^{N/2-i} K_{MOD}$ for $i=1, 2, \ldots, N/2-1$ (step S510). Taking 64-QAM modulation in 802.11a as an example, N is set to 6 and $K_{MOD} = 1/\sqrt{42}$. The calculator 420 receives the selected coefficient $C_i$ from the storage unit 410 and takes a received signal $y_k$ and a channel response $H_k$ in the frequency domain, $k=0, 1, \ldots,$ $N_{SD}-1$ (step S520). On the basis of $C_i$, $y_k$ and $H_k$, the calculator 420 generates at least N number of bit metrics for an N-bit codeword in the received signal. As described earlier, the bit metrics $\hat{\Lambda}(b_{k,n})$, $n=0, 1, \ldots, N-1$, are obtained by calculating $\hat{X}(b_{k,0}), \ldots, \hat{X}(b_{k,N/2-1})$ for I component and $\hat{X}(b_{k,N/2}), \ldots, \hat{X}(b_{k,N-1})$ for Q component with equations (4) and (5) (step S530), respectively, and multiplying $\hat{X}(b_{k,0}), \ldots, \hat{X}(b_{k,N-1})$ by $1/\alpha_k$ in accordance with equation (3) (step S540). The apparatus 400 is further composed of a quantizer 430. With the quantizer 430, $\hat{\Lambda}(b_{k,0}), \ldots, \hat{\Lambda}(b_{k,N-1})$ are quantized into $2^D$ levels between first and second predetermined values (step S550), where D is a positive integer. At last, the quantized D-bit metrics $\Pi(b_{k,0}), \ldots, \Pi(b_{k,N-1})$ are supplied as input to a soft-decision decoder (not shown).

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for calculating bit metrics in data receivers, comprising:
   a storage unit for storing a plurality of modulation-dependent coefficients and selecting as output one of the coefficients in accordance with a modulation mode being used; and
   a calculator receiving the selected coefficient from the storage unit and taking a received signal and a channel response, for generating at least N number of bit metrics for an N-bit codeword in the received signal based on a function of the selected coefficient, the received signal and the channel response;
   wherein the selected coefficient depending on the modulation mode being used is defined by:

$$C_i = 2^{N/2-i} K_{MOD}, \text{ for } i=1, 2, \ldots, N/2-1$$

where $K_{MOD}$ is a modulation-dependent normalization factor and N is an even integer.

2. The apparatus as recited in claim 1 wherein the N-bit codeword represents a constellation point comprising an I component and a Q component, and the bit metrics in respect of the I component for the N-bit codeword are calculated from:

$$\hat{X}(b_{n_i}) = \begin{cases} \text{Re}[yH^*], & \text{if } i = 0 \\ -|\hat{X}(b_{n_{i-1}})| + C_i|H|^2, & \text{otherwise} \end{cases}$$

where
   subscript $n_i$ is an integer and bits $(b_{n_0} b_{n_1} \ldots b_{n_{N/2-1}})$ encode the I component of the N-bit codeword,
   superscript * denotes complex conjugation,
   Re denotes the real part of a complex number,
   y denotes the received signal,
   H denotes the channel response, and
   $C_i$ denotes the selected coefficient, for $i=1, 2, \ldots, N/2-1$.

3. The apparatus as recited in claim 1 wherein the N-bit codeword represents a constellation point comprising an I component and a Q component, and the bit metrics in respect of the Q component for the N-bit codeword are calculated from:

$$\hat{X}(b_{n_i}) = \begin{cases} \text{Im}[yH^*], & \text{if } i = 0 \\ -|\hat{X}(b_{n_{i-1}})| + C_i|H|^2, & \text{otherwise} \end{cases}$$

where subscript $n_i$ is an integer and bits $(b_{n_0}b_{n_1}\ldots b_{n_{N/2-1}})$ encode the Q component of the N-bit codeword, superscript * denotes complex conjugation, Im denotes the imaginary part of a complex number, y denotes the received signal, H denotes the channel response, and $C_i$ denotes the selected coefficient, for $i=1, 2, \ldots, N/2-1$.

4. The apparatus as recited in claim 1 wherein the calculator generates the bit metrics for the N-bit codeword in the received signal using the function as follows:

$$\hat{X}(b_i) = \begin{cases} \text{Re}[yH^*], & i = 0 \\ -|\hat{X}(b_{i-1})| + C_i|H|^2, & i = 1, 2, \ldots, N/2-1 \end{cases} \text{ for } I \text{ component}$$

$$\hat{X}(b_{N/2+i}) = \begin{cases} \text{Im}[yH^*], & i = 0 \\ -|\hat{X}(b_{N/2+i-1})| + C_i|H|^2, & i = 1, 2, \ldots, N/2-1 \end{cases} \text{ for } Q \text{ component}$$

where bits $(b_0 b_1 \ldots b_{N/2-1})$ encode the I component of the N-bit codeword, bits $(b_{N/2} b_{N/2+1} \ldots b_{N-1})$ encode the Q component of the N-bit codeword, superscript * denotes complex conjugation, Re and Im denote real and imaginary parts of a complex number, respectively, y denotes the received signal, and H denotes the channel response.

5. The apparatus as recited in claim 1 wherein the N-bit codeword represents a constellation point comprising an I component and a Q component, and the bit metrics in respect of the I component for the N-bit codeword are calculated from:

$$\hat{X}(b_{k,n_i}) = \begin{cases} \text{Re}[y_k H_k^*], & \text{if } i = 0 \\ -|\hat{X}(b_{k,n_{i-1}})| + C_i|H_k|^2, & \text{otherwise} \end{cases}$$

where subscript $n_1$ is an integer and bits $(b_{k,n_0}b_{k,n_1}\ldots b_{k,n_{N/2-1}})$ encode the I component of the N-bit codeword, superscript * denotes complex conjugation, Re denotes the real part of a complex number, subscript k denotes a subcarrier index, $y_k$ denotes the received signal of subcarrier k, $H_k$ denotes the channel response of subcarrier k, and $C_i$ denotes the selected coefficient, for $i=1, 2, \ldots, N/2-1$.

6. The apparatus as recited in claim 1 wherein the N-bit codeword represents a constellation point comprising an I component and a Q component, and the bit metrics in respect of the Q component for the N-bit codeword are calculated from:

$$\hat{X}(b_{k,n_i}) = \begin{cases} \text{Im}[y_k H_k^*], & \text{if } i = 0 \\ -|\hat{X}(b_{k,n_{i-1}})| + C_i|H_k|^2, & \text{otherwise} \end{cases}$$

where subscript $n_i$ is an integer and bits $(b_{k,n_0}b_{k,n_1}\ldots b_{k,n_{N/2-1}})$ encode the Q component of the N-bit codeword, superscript * denotes complex conjugation, Im denotes the imaginary part of a complex number, subscript k denotes a subcarrier index, $y_k$ denotes the received signal of subcarrier k, $H_k$ denotes the channel response of subcarrier k, and $C_i$ denotes the selected coefficient, for $i=1, 2, \ldots, N/2-1$.

7. The apparatus as recited in claim 1 wherein the calculator generates the bit metrics for the N-bit codeword in the received signal using the function as follows:

$$\hat{X}(b_{k,i}) = \begin{cases} \text{Re}[y_k H_k^*], & i = 0 \\ -|\hat{X}(b_{k,i-1})| + C_i|H_k|^2, & i = 1, 2, \ldots, N/2-1 \end{cases} \text{ for } I \text{ component}$$

$$\hat{X}(b_{k,N/2+i}) = \begin{cases} \text{Im}[y_k H_k^*], & i = 0 \\ -|\hat{X}(b_{k,N/2+i-1})| + C_i|H_k|^2, & i = 1, 2, \ldots, N/2-1 \end{cases}$$

for $Q$ component where bits $(b_0 b_1 \ldots b_{N/2-1})$ encode the I component of the N-bit codeword, bits $(b_{N/2} b_{N/2+1} \ldots b_{N-1})$ encode the Q component of the N-bit codeword, superscript * denotes complex conjugation, Re and Im denote real and imaginary parts of a complex number, respectively, subscript k denotes a subcarrier index, $y_k$ denotes the received signal of subcarrier k, and $H_k$ denotes the channel response of subcarrier k.

8. The apparatus as recited in claim 1 wherein each bit metric can further be multiplied by $1/\alpha_k$, where $\alpha_k$ is a noise normalization factor of subcarrier k.

9. A method for calculating bit metrics in data receivers, comprising the steps of:

selecting one of a plurality of modulation-dependent coefficients in accordance with a modulation mode being used;

taking a received signal and a channel response in a frequency domain; and calculating at least N number of bit metrics for an N-bit codeword in the received signal based on the selected coefficient, the received signal and the channel response;

wherein the selected coefficient depending on the modulation mode being used is defined by:

i $C_i = 2^{N/2-i} K_{MOD}$, for $i=1, 2, \ldots, N/2-1$ where $K_{MOD}$ is a modulation-dependent normalization factor and N is an even integer.

10. The method as recited in claim 9 wherein the N-bit codeword represents a constellation point having an I component and a Q component, and the calculating step further comprises the steps of:

computing a multiplication product of the received signal and the complex conjugate of the channel response; and computing each of the bit metrics in respect of the I component for the N-bit codeword based on the selected coefficient along with a related piecewise linear function of the multiplication product's real part.

11. The method as recited in claim 9 wherein the N-bit codeword represents a constellation point having an I component and a Q component, and the calculating step further comprises the steps of:

computing a multiplication product of the received signal and the complex conjugate of the channel response; and computing each of the bit metrics in respect of the Q component for the N-bit codeword based on the selected coefficient along with a related piecewise linear function of the multiplication product's imaginary part.

12. The method as recited in claim 9 wherein the N-bit codeword represents a constellation point comprising an I component and a Q component, and the calculating step generates the bit metrics in respect of the I component for the N-bit codeword by:

$$\hat{X}(b_{n_i}) = \begin{cases} \text{Re}[yH^*], & \text{if } i = 0 \\ -|\hat{X}(b_{n_{i-1}})| + C_i|H|^2, & \text{otherwise} \end{cases}$$

where
subscript $n_i$ is an integer and bits $(b_{n_0} b_{n_1} \ldots b_{n_{N/2-1}})$ encode the I component of the N-bit codeword,
superscript * denotes complex conjugation,
Re denotes the real part of a complex number,
y denotes the received signal,
H denotes the channel response, and
$C_i$ denotes the selected coefficient, for $i=1, 2, \ldots, N/2-1$.

13. The method as recited in claim 9 wherein the N-bit codeword represents a constellation point comprising an I component and a Q component, and the calculating step generates the bit metrics in respect of the Q component for the N-bit codeword by:

$$\hat{X}(b_{n_i}) = \begin{cases} \text{Im}[yH^*], & \text{if } i = 0 \\ -|\hat{X}(b_{n_{i-1}})| + C_i|H|^2, & \text{otherwise} \end{cases}$$

where
subscript $n_i$ is an integer and bits $(b_{n_0} b_{n_1} \ldots b_{n_{N/2-1}})$ encode the Q component of the N-bit codeword,
superscript * denotes complex conjugation,
Im denotes the imaginary part of a complex number,
y denotes the received signal,
H denotes the channel response, and
$C_i$ denotes the selected coefficient, for $i=1, 2, \ldots, N/2-1$.

14. The method as recited in claim 9 wherein the calculating step generates the bit metrics for the N-bit codeword in the received signal using the following function:

$$\hat{X}(b_i) = \begin{cases} \text{Re}[yH^*], & i = 0 \\ -|\hat{X}(b_{i-1})| + C_i|H|^2, & i = 1, 2, \ldots, N/2-1 \end{cases} \text{ for } I \text{ component}$$

$$\hat{X}(b_{N/2+i}) = \begin{cases} \text{Im}[yH^*], & i = 0 \\ -|\hat{X}(b_{N/2+i-1})| + C_i|H|^2, & i = 1, 2, \ldots, N/2-1 \end{cases} \text{ for } Q \text{ component}$$

where
bits $(b_0 b_1 \ldots b_{N/2-1})$ encode the I component of the N-bit codeword,
bits $(b_{N/2} b_{N/2+1} \ldots b_{N-1})$ encode the Q component of the N-bit codeword,
superscript * denotes complex conjugation,
Re and Im denote real and imaginary parts of a complex number, respectively,
y denotes the received signal, and
H denotes the channel response.

15. The method as recited in claim 9 wherein the N-bit codeword represents a constellation point comprising an I component and a Q component, and the calculating step generates the bit metrics in respect of the I component for the N-bit codeword by:

$$\hat{X}(b_{k,n_i}) = \begin{cases} \text{Re}[y_k H_k^*], & \text{if } i = 0 \\ -|\hat{X}(b_{k,n_{i-1}})| + C_i|H_k|^2, & \text{otherwise} \end{cases}$$

where
subscript $n_i$ is an integer and bits $(b_{k,n_0} b_{k,n_1} \ldots b_{k,n_{N/2-1}})$ encode the I component of the N-bit codeword,
superscript * denotes complex conjugation,
Re denotes the real part of a complex number,
subscript k denotes a subcarrier index,
$y_k$ denotes the received signal of subcarrier k,
$H_k$ denotes the channel response of subcarrier k, and
$C_i$ denotes the selected coefficient, for $i=1, 2, \ldots, N/2-1$.

16. The method as recited in claim 9 wherein the N-bit codeword represents a constellation point comprising an I component and a Q component, and the calculating step generates the bit metrics in respect of the Q component for the N-bit codeword by:

$$\hat{X}(b_{k,n_i}) = \begin{cases} \text{Im}[y_k H_k^*], & \text{if } i = 0 \\ -|\hat{X}(b_{k,n_{i-1}})| + C_i|H_k|^2, & \text{otherwise} \end{cases}$$

where
subscript $n_i$ is an integer and bits $(b_{k,n_0} b_{k,n_1} \ldots b_{k,n_{N/2-1}})$ encode the Q component of the N-bit codeword,
superscript * denotes complex conjugation,
Im denotes the imaginary part of a complex number,
subscript k denotes a subcarrier index,
$y_k$ denotes the received signal of subcarrier k,
$H_k$ denotes the channel response of subcarrier k, and
$C_i$ denotes the selected coefficient, for $i=1, 2, \ldots, N/2-1$.

17. The method as recited in claim 9 wherein the calculating step generates the bit metrics for the N-bit codeword in the received signal using the following function:

$$\hat{X}(b_{k,i}) = \begin{cases} \text{Re}[y_k H_k^*], & i = 0 \\ -|\hat{X}(b_{k,i-1})| +, & i = 1, 2, \ldots, \\ C_i |H_k|^2, & N/2 - 1 \end{cases} \text{for } I \text{ component}$$

$$\hat{X}(b_{k,N/2+i}) = \begin{cases} \text{Im}[y_k H_k^*], & i = 0 \\ -|\hat{X}(b_{k,N/2+i-1})| +, & i = 1, 2, \ldots, \\ C_i |H_k|^2, & N/2 - 1 \end{cases} \text{for } Q \text{ component}$$

where bits $(b_0 b_1 \ldots b_{N/2-1})$ encode the I component of the N-bit codeword, bits $(b_{N/2} b_{N/2+1} \ldots b_{N-1})$ encode the Q component of the N-bit codeword, superscript * denotes complex conjugation, Re and Im denote real and imaginary parts of a complex number, respectively, subscript k denotes a subcarrier index, $y_k$ denotes the received signal of subcarrier k, and $H_k$ denotes the channel response of subcarrier k.

18. The method as recited in claim 9 further comprising the step of multiplying each bit metric by $1/\alpha_k$, where $\alpha_k$ is a noise normalization factor of subcarrier k.

* * * * *